United States Patent [19]

Sorio

[11] Patent Number: 4,986,937
[45] Date of Patent: Jan. 22, 1991

[54] CENTRAL AIR DUCT SCOOPER HUMIDIFIER

[76] Inventor: George Sorio, 205 W. 53rd Ter., Kansas City, Mo. 64110

[21] Appl. No.: 397,271

[22] Filed: Aug. 23, 1989

[51] Int. Cl.$^5$ ................................ B01F 3/04
[52] U.S. Cl. ............................ 261/81; 261/DIG. 15; 261/DIG. 48; 126/113
[58] Field of Search ........ 261/DIG. 48, 81, DIG. 15; 126/113

[56] References Cited

U.S. PATENT DOCUMENTS

| | | | |
|---|---|---|---|
| 3,136,829 | 6/1964 | Skerritt | 261/DIG. 15 |
| 3,378,238 | 4/1968 | Babington et al. | 261/DIG. 15 |
| 3,405,919 | 10/1968 | Fisher et al. | 261/DIG. 15 |
| 3,664,324 | 5/1972 | Radtke | 126/113 |
| 3,770,254 | 11/1973 | Morrow | 261/DIG. 15 |
| 3,776,214 | 12/1973 | Coffman | 126/113 |
| 4,354,985 | 10/1982 | Johnson | 261/DIG. 15 |
| 4,564,375 | 1/1986 | Muak et al. | 261/DIG. 15 |
| 4,738,805 | 4/1988 | Lawson | 261/24 |
| 4,741,871 | 5/1988 | Payha | 261/DIG. 15 |
| 4,820,453 | 4/1989 | Huang | 261/DIG. 48 |

FOREIGN PATENT DOCUMENTS

| | | | |
|---|---|---|---|
| 859942 | 12/1952 | Fed. Rep. of Germany | 261/DIG. 48 |
| 55-127215 | 10/1980 | Japan | 261/DIG. 48 |
| 63-0251739 | 10/1988 | Japan | 261/DIG. 48 |

*Primary Examiner*—Tim Miles
*Attorney, Agent, or Firm*—Michael Yakimo, Jr.

[57] ABSTRACT

An ultrasonic humidifier system which is mounted to an air duct of a heating system. A vibrator excites water within a reservoir so as to create a fog within a fog chamber. A panel directs air flow from an upstream furnace into the fog chamber for interaction of the air flow with the fog. This interaction increases the moisture content of the air flow so as to increase the humidity level thereof. Reed switches are provided to preclude vibration if the level within the reservoir is low and/or if no air stream is delivered from the furnace.

11 Claims, 2 Drawing Sheets

CENTRAL AIR DUCT SCOOPER HUMIDIFIER

BACKGROUND OF THE INVENTION

This invention pertains to a humidifier system for use in central heating systems and more particularly to a system which interacts an air stream with a moisture-laden fog to increase the humidity of the air.

Various humidifiers have been used in the connection with home or commercial heating systems to increase the humidity level of a discharged, heated air stream. The use of a humidifier in a hot air heating system presents various advantages such as lower heating costs and a reduction in the dryness of furniture an interior walls as well as of textile fabrics. From a medical point of view, a proper humidity level in the air will enhance the comfort of the dwelling occupant as the moisture in the air inhibits an undesirable drying of the nasal passages and the discomfort associated therewith. Furthermore the increase in air moisture enables the occupant to feel more comfortable at a lower temperature level.

Various types of humidifying devices have been used to achieve the above advantages and results. Normally these devices include the use of a water absorbent material, such as a pad, which is placed in the air stream passing through an air duct. The air stream passes through this absorbent material prior to its downstream discharge into the room. This interaction causes the air to absorb the moisture in the absorbent material and increase the air humidity level.

Although assumably effective in operation, the absorbent material tends to become dried out due to the periodic heating and cooling of the absorbent material. These actions reduce the ability of the absorbent material to absorb water and the ability to deliver a sufficient amount of moisture to the air stream interacting therethrough. The material also obstructs the air flow and thus reduces the air flow pressure.

In response thereto I have invented a humidifier system having a water reservoir and an overlying fog chamber therein. An ultrasonic vibrator excites/atomizes the water in the water reservoir/chamber into a mist so as to produce a moisture-laden fog in the fog chamber. The resulting mist/fog interacts with an air stream directed through the fog chamber so as to increase the air stream humidity. The humidified air is then discharged from the humidifier for downstream delivery into the various spaces fed by the heating duct system. My system does not obstruct the duct flow and is simple to install and easy to clean and maintain.

Accordingly it is a general object of this invention to provide a humidifier system which produces a mist/fog for interaction with an air stream to humidify the same.

Another object of this invention is to provide a humidifier, as aforesaid, which utilizes an ultrasonic vibrator to agitate water in a water reservoir so as to produce said fog.

Still another object of this invention is to provide an air humidifier, as aforesaid, which includes an air scooper panel to deflect a portion of the air stream from an air duct and through a fog chamber.

Another object of this invention is to provide an air humidifier, as aforesaid, which allows for an unobstructed flow of duct air therethrough.

A still further object of this invention is to provide an air humidifier with air scooper, as aforesaid, which senses the presence of an air stream so as to control the delivery of current to the ultrasonic vibrator.

Another object of this invention is to provide a humidifier system with a water deflector within the water reservoir, as aforesaid, which stabilizes the wave action in the water reservoir.

Another particular object of this invention is to provide
a humidifier system, as aforesaid, which utilizes a water deflector to delimit the travel of any water spray in the water reservoir.

A further particular object of this invention is to provide a humidifier system, as aforesaid, which senses the presence of water within the water reservoir so as to control the delivery of current to the vibrator.

Other objects and advantages of this invention will become apparent from an inspection of the specification, drawings and claims submitted herewith.

DESCRIPTION OF THE PREFERRED EMBODIMENT

Turning more particularly to the drawings, the humidifying system 100 is illustrated in use with the central air duct 500 of a forced air heating system (not shown). The central air duct 500 lies immediately downstream of the furnace (not shown) proper. This central air duct 500 directs the heated air from the furnace to downstream branches/trunks of the heating duct system for room delivery. My now preferred embodiment of the system 100 is mounted to this central air duct 500 for humidifying this pressurized, heated air delivered from the upstream furnace.

Figure 2:
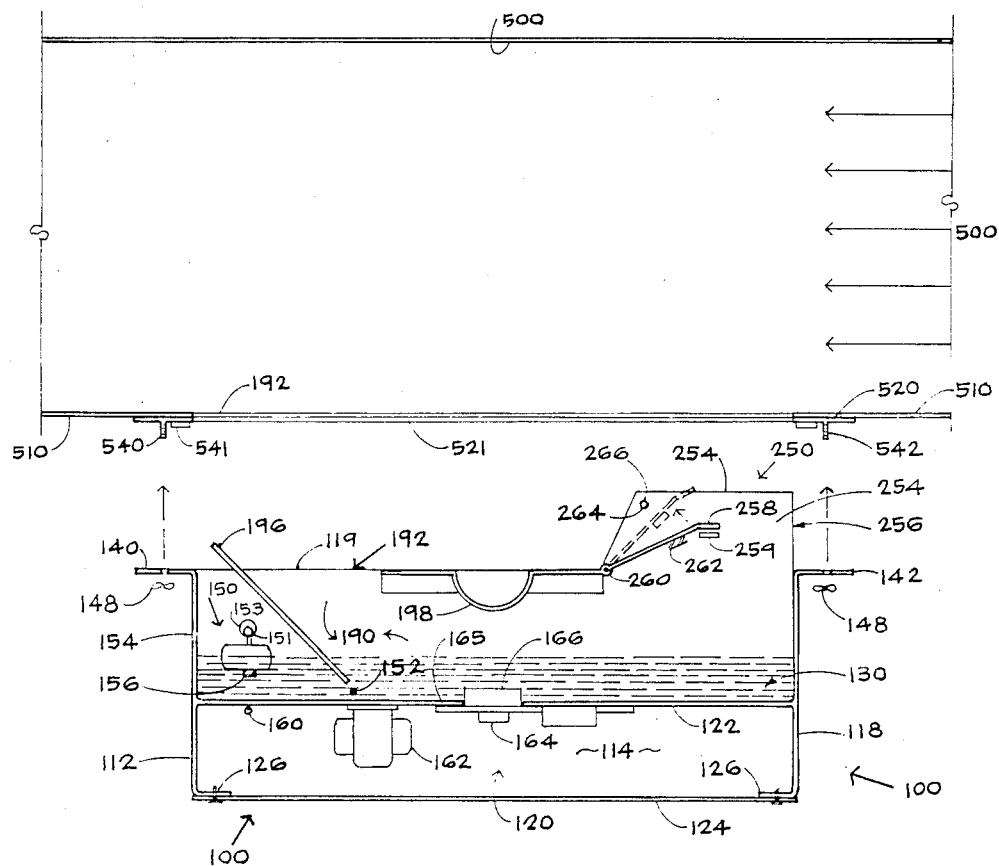
FIG. 2 is a side view of the humidifier system, on a reduced scale and displaced from an air duct, with a sidewall of the system being removed to show the interior elements thereof.

FIG. 2 illustrates the system 100 inferiorly displaced from the central air duct 500. A generally rectangular duct template 520 with rectangular aperture 521 is mounted to the bottom wall 510 of the air duct 500. Upon affixation to this bottom wall 510 the rectangular template presents four depending threaded studs at the corners thereof (540, 542 shown). The template aperture 521 presents a generally rectangular aperture. This aperture defines an outline defining the portion of the bottom duct wall 510 for removal. Upon such removal a similar aperture is presented within the duct wall 510 which corresponds to the generally rectangular configuration defined by the end walls and side walls of the system 100 proper. The four depending studs (540, 542 shown) are designed for extension through apertures 140a, 142a in mounting lips 140, 142 which extend along the end walls 112,118 of the system 100. Upon placement of the system 100 adjacent the bottom wall 510 of duct 500, the studs extend through corresponding apertures 140a, 142a within lips 140, 142. Wing nuts 148 functionally engage these protruding studs 540, 542 and bear against the mounting lips 140, 142 so as to hold the humidifier system 100 in a proper position relative to the air duct 500. A rectangular foam gasket 541 may be interposed between the bottom wall 510 and mounting lips 140, 142.

Generally the system 100 comprises a rectangular housing 110 as formed by end walls 112, 118 and side walls 114, 116. The housing includes a control compartment 120, water reservoir 130 and a fog chamber 190 therein. Atop the fog chamber 190 at one end thereof is an air scooper compartment generally designated as 250 The compartment 250 protrudes into the air duct 500 upon the above-described affixation of the humidifying system 100 thereto.

The control chamber/compartment 120 is positioned below the water reservoir 130. A magnetic responsive reed switch 160 is mounted to the top wall 122 of the control compartment 120 which is also the bottom wall 122 of the water reservoir 130. Also mounted to this wall 122 is a transformer 162 for converting the house current to a current for energizing the ultrasonic vibrator 164. The vibrator 164 is a known ultrasonic transducer vibrator which is mounted to the top wall 122 with the resonator portion 166 extending therethrough. A gasket 165 surrounds this resonator portion 166 so as to preclude leakage of water from the water reservoir 130 into the control compartment 120. A bottom plate 124 is releasably attached by screws or the like to mounting flanges 126. This coverplate 124 closes the control compartment 120.

Positioned atop the control compartment 120 is the water reservoir 130 as formed by the side wall 114, 116 and end walls 112, 118 of the humidifier system 100. An aperture 152 extends through the sidewall 114. Opening and closure of this aperture is regulated by a float control valve 150. The valve has an arm 151 with nipple 153 at one end thereof. The nipple 153 extends into the inlet port 152 which is connected to a water line (not shown). Upon the float valve 150 reaching a preselected maximum, corresponding to the desired maximum water level within the reservoir 130, the float valve 150 nipple 153 closes port 152 so as to preclude further entry of water therethrough. An overflow outlet 154 in wall 112 lies above the desired water level. A hose (not shown) is connected to this outlet 154 for discharge of any overflow water to a drain or the like.

It is here noted that the float valve 150 has a magnet 156 at the bottom thereof. If little or no water is in the water reservoir 130 the float valve 150 sinks towards the bottom wall 122 of the reservoir 130 with the magnet 156 being positioned adjacent the reed switch 160. This action causes the reed switch 160 to open and preclude delivery of current to the vibrator unit 164 via the circuitry a shown in FIG. 3.

The fog chamber 190 lies atop the water reservoir 130. Extending through the fog chamber 190, water reservoir 130 and above the walls of the housing 100 is an air deflector 196. A water deflector 198 is positioned adjacent the deflector 196 so as to present an outlet 192 space therebetween. The functions of the air 196 and water 198 deflectors are to be subsequently described.

Upwardly extending from this top wall 119 of the humidifier system 100 is an air scooper compartment 250. This compartment comprises first and second spaced apart side walls 252, 254 which present an air inlet 256 space therebetween. As above described this compartment 250 extends into the air duct 500 upon humidifier 100 mounting.

Also located within compartment 250 is an air scooper panel 258. This panel 258 may be mounted in a fixed position between walls 252, 254 or, as illustrated, may be swingably mounted in clockwise and counter clockwise directions as provided by the hinge 260 extending through apertures 261 in the walls 252, 254. The clockwise rotation of panel 258 is limited by a lug 259 extending from a sidewall 254 of the compartment 250. A magnet 262 is mounted to a surface of the air scooper panel 258 and is designed to activate a reed switch 264 mounted on the sidewall 254 and at the limit of the counter clockwise motion o panel 258. The purpose of this magnet 262/reed switch 264 combination is to be subsequently described.

Figure 1:
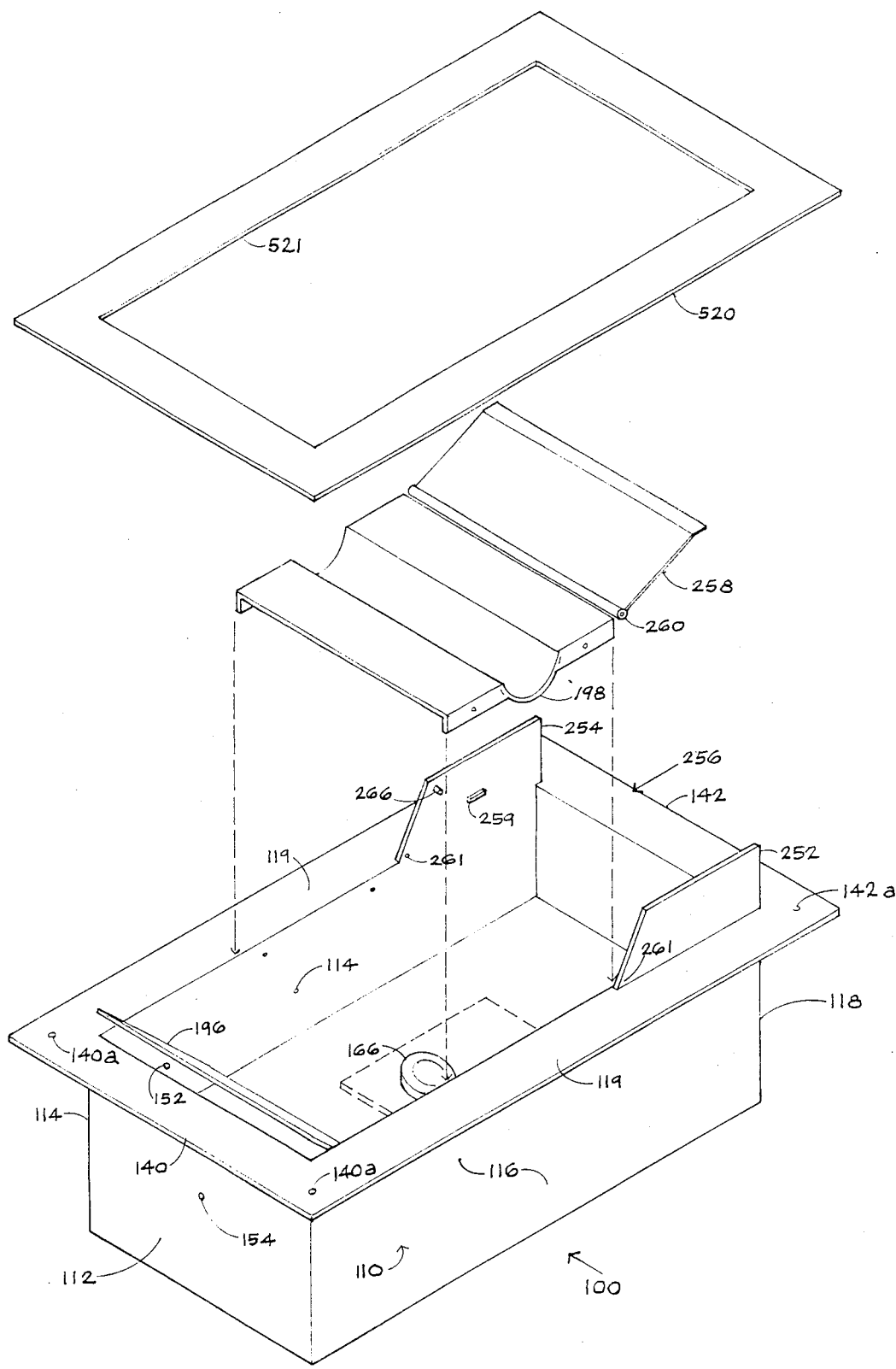
FIG. 1 is an isometric view of the humidifier system with the water deflector/scooper panel of the humidifier system being displaced to show the interior parts thereof.
Figure 3:
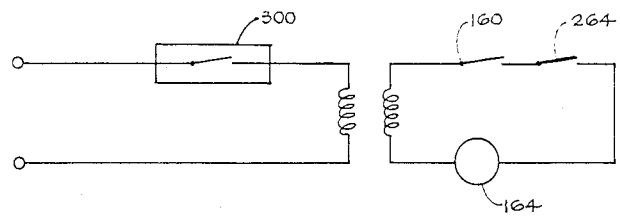
FIG. 3 is a schematic diagram illustrating one form of circuitry of the humidifier system.

A schematic illustrating one form of current flow to the device is as shown in FIG. 3. A humidistat 300 is placed in a room area and set at a desired humidity level. If the humidity in the room air is below a desired level the humidistat 300 will close. Assuming a proper water level, i.e. above a preselected minimum, is found in the water reservoir 130, the magnet 156 of the float valve 150 is displaced from the normally closed reed switch 160. This displacement causes the reed switch 160 to remain closed. Upon a forced air stream flow being delivered from the furnace a portion of the air will enter the air scooper compartment 250 through the air inlet 256. This action will cause a swingable counterclockwise movement of the scooper panel 258 to a position in which the magnet 262 is adjacent the reed switch 264 and closes the same. As the humidistat 300 and reed switches 160, 264 are closed, current will flow to the vibrator 164. If a proper humidity level is sensed by humidistat 300 or if there is an improper water level in reservoir 130 or if no forced air is entering compartment 250, there will be an open in the FIG. 3 circuit. This "open" precludes current flow to vibrator 164.

It is here noted that the scooper panel 258 may be mounted in a fixed position between sidewalls 252, 254. As such the reed switch 264 is not required.

Upon current flow to the vibrator 164 the vibrating unit will agitate/excite the water molecules such that water droplets will be created and a mist/fog results in the overlying fog chamber 190. This moisture-laden fog chamber 190 will interact with a portion of the forced air flow which has been directed through the inlet 256 and into the fog chamber 190. The air flow and fog is discharged through the outlet 192 as directed by the air deflector 196. The resulting fog in the duct 500 may further interact with the air stream passing therethrough. This air/fog interaction within and without the fog chamber 190 will increase the moisture level of the air stream for downstream delivery to the room. Once the proper level is sensed, the humidistat 300 will open and cease operation of the vibrator 164. Assuming that the humidity level of the measured room is a proper level, the humidistat will remain open. Thus upon subsequent air entering the system 100, the vibrator 164 will not be energized. It is here understood that other variations of the air scooper compartment 250 may be utilized in a manner where the air flow may go straight through the compartment 250 when the humidity level is at a desired preselected level.

The water deflector 198, as mounted between the sidewalls 114, 116, extends into the fog chamber 190 and above the water reservoir 130. This deflector serves to break the water shot upward from the underlying vibrating unit 166. It is also noted that the air deflector 198 also acts as a flow stabilizer and retards the water waves created within the reservoir 130 either by the entry of the water into the water reservoir via port 152 or by the vibrating unit 166.

Although a certain form of this invention has herein been described and illustrated it is to be understood that my invention is not to be limited thereto except as set forth in the following claims and functional equivalents thereof.

What I claim is:

1. An air humidification system comprising:
   a housing;
   an inlet air compartment mounted on said housing;
   an inlet in said compartment for entry of an air stream passing through an air duct of a home heating system;
   a water reservoir in said housing;
   means for delivering water to said reservoir;
   a fog chamber in communication with said water reservoir;
   fogging means in said housing and extending into said reservoir;
   circuit means for energizing said fogging means, said fogging means interacting with said housing and extending into said reservoir;
   circuit means for energizing said fogging means, said fogging means interacting with said water for creating a fog in said fog chamber upon closure of a normally open switch in said inlet air compartment responsive to a magnetic field;
   means for mounting said housing to said air duct with said air compartment in communication with said air duct, said air stream passing through said duct and through said inlet;
   means for directing said air stream to said fog chamber for interaction with said fog to humidify said air stream, said directing means including a panel in said inlet air compartment;
   an outlet in said housing and in communication with said air duct and fog compartment, said humidified air stream being discharged through said outlet and into said duct;
   a magnet mounted to said panel;
   means for mounting said panel in said inlet air compartment between a first position in which said magnet is adjacent said switch and a second position displacing said magnet from said switch;
   said air stream passing through said inlet moving said panel and magnet to said first position for closure of said switch, whereby said circuit means energizes said fogging means.

2. The device as claimed in claim 1 further comprising:
   a water deflector;
   means for mounting said water deflector in said fog chamber, said water deflector delimiting the splashing of water in said fog chamber.

3. The device as claimed in claim 1 wherein said mounting means comprise:
   a plurality of threaded studs depending from said air duct;
   a mounting flange on said housing for engaging said studs whereby said engagement mounts said housing adjacent said central air duct with said air compartment protruding therein.

4. The device as claimed in claim 1 further comprising a deflector in said fog chamber for directing said humidified air to said outlet.

5. The device as claimed in claim 4 wherein said deflector further directs fog from said fog chamber to said outlet port.

6. The device as claimed in claim 4 wherein said deflector delimits wave action of said water in said reservoir.

7. The device as claimed in claim 1 wherein said delivering means comprises:
   an inlet port in said housing and in communication with said reservoir;
   a valve for closure of said housing inlet port;
   means for controlling the movement of said valve between first and second positions opening and closing said port;
   means for communicating said housing inlet port with a water supply, whereby said open inlet port injects water from said water supply into said reservoir.

8. The device as claimed in claim 7 wherein said valve control means comprises:
   a float responsive to a water level in said reservoir;
   means for linking said float to said valve whereby said float moves said valve to said second position upon said water reaching a predetermined level in said reservoir.

9. The device as claimed in claim 8 further comprising:
   a switch associated with said water reservoir, said switch in said circuit means;
   means in said water reservoir for opening said switch when said water level in said reservoir is below a desired minimum, said open switch precluding passage of current through said circuit means and energization of said fogging means.

10. The device as claimed in claim 9 wherein said switch opening means comprises:
    means in said switch responsive to a magnetic field;
    a magnet on said float valve, said magnet being adjacent said switch upon said water level falling below a desired minimum, whereby to open said switch.

11. An air humidification system comprising:
    a housing;
    an inlet air compartment mounted on said housing;
    an inlet in said compartment for entry of an air stream passing through an air duct of a home heating system;
    a water reservoir in said housing;
    means for delivering water to said reservoir, said means comprising:
        an inlet port in said housing and in communication with said reservoir;
        a valve for opening and closing said housing inlet port;
        means for communicating said housing inlet port with a water supply for entry of water from said water supply into said reservoir through an open housing inlet port;
    a fog chamber in communication with said water reservoir;
    fogging means in said housing and extending into said reservoir;
    circuit means for energizing said fogging means, said fogging means interacting with said water for creating a fog in said fog chamber;
    means for mounting said housing to said air duct with said air compartment in communication with said air duct, said air stream passing through said duct and through said inlet;
    means for directing said air stream to said fog chamber for interaction with said fog to humidify said air stream;

an outlet in said housing and in communication with said air duct and fog compartment, said humidified air stream being discharged through said outlet and into said duct;

a float responsive to a water level in said reservoir;

means for linking said float to said valve, said float moving said valve to a position closing said housing inlet port upon said water reaching a predetermined level in said reservoir;

a switch associated with said water reservoir, said switch a part of said circuit means;

means in said switch responsive to a magnetic field; and a magnet on said float valve, said magnet being adjacent said switch upon said water level falling below a desired minimum, whereby to open said switch and preclude energizing said fogging means.

* * * * *

UNITED STATES PATENT AND TRADEMARK OFFICE
CERTIFICATE OF CORRECTION

PATENT NO. : 4,986,937
DATED : January 22, 1991
INVENTOR(S) : GEORGE SORIO

It is certified that error appears in the above—identified patent and that said Letters Patent is hereby corrected as shown below:

Column 5, claim 1, delete lines 19-21.

Column 5, claim 3, line 56, change "comprise" to "comprises".

Column 5, claim 4, line 63, change "I" to "1".

Signed and Sealed this

Eighteenth Day of August, 1992

Attest:

DOUGLAS B. COMER

*Attesting Officer*     Acting Commissioner of Patents and Trademarks